Sept. 2, 1952  H. W. HAPMAN  2,609,250
PRESSURIZED CONVEYER FOR POWDERED MATERIAL
Filed May 7, 1948

Inventor
Henry W. Hapman
Barthel + Bugbee
Attorneys

Patented Sept. 2, 1952

2,609,250

UNITED STATES PATENT OFFICE 2,609,250

PRESSURIZED CONVEYER FOR POWDERED MATERIAL

Henry W. Hapman, Detroit, Mich., assignor, by mesne assignments, of forty per cent to Hannah Jane Hapman, Detroit, Mich.

Application May 7, 1948, Serial No. 25,553

10 Claims. (Cl. 302—49)

This invention relates to conveyors and, in particular, to conveyors for carrying material into an enclosure which is under pressure.

One object of this invention is to provide a conveyor system for carrying material into an enclosure which is under pressure higher than atmospheric pressure, without causing leakage either of the material or of the pressure.

Another object is to provide a conveyor system for carrying powdered material from a supply container to a working or delivery container which is required to sustain a super-atmospheric pressure and which employs a gas under pressure, such as compressed air, for transferring this material from the working compartment to the point of use.

Another object is to provide a conveyor system for carrying powdered material, such as powdered coal, from a supply container to a delivery container from which it is projected by a compressed air blast, such as through a nozzle, into the fire box of a steam boiler, or into the combustion chamber of a gas turbine, the delivery container being under a pressure higher than atmospheric pressure.

Another object is to provide a conveyor system for handling powdered material, as set forth in the preceding objects, wherein the entire circuit of the conveyor is in a substantially pressure-tight compartment or series of compartments, one of these compartments preferably forming a delivery compartment which is at a somewhat higher pressure than the other compartments.

Another object is to provide a conveyor system for handling powdered material, as set forth in the preceding objects, wherein the material is discharged through a longitudinally tapered opening so as to give a substantially continuous and uninterrupted flow of material and eliminate pulsations of flow.

Figures 1, 2:
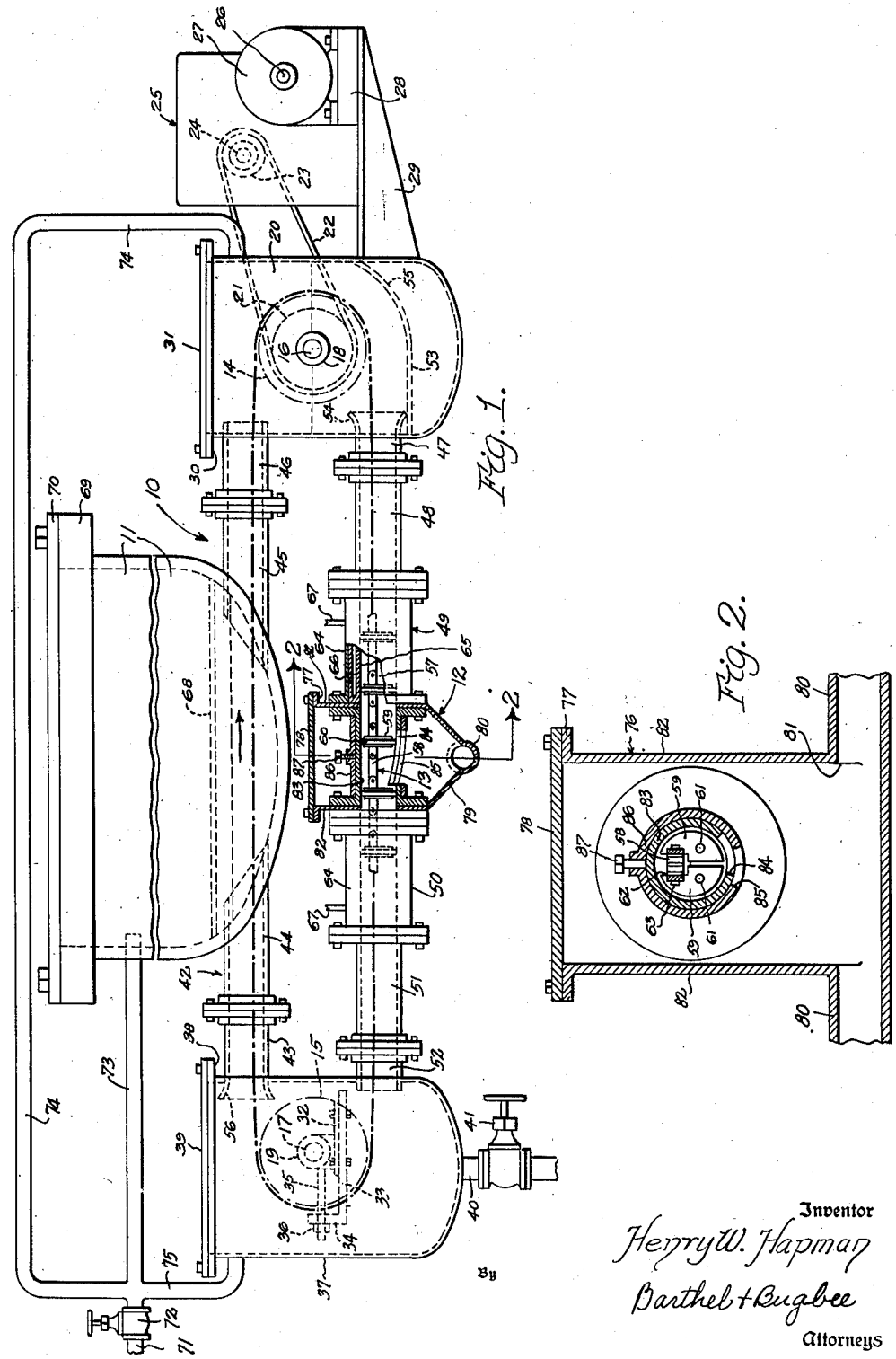
Figure 1 is a side elevation, partly in section, of a pressurized conveyor system, according to a preferred form of the invention.
Figure 2 is a vertical cross-section through the delivery container taken along the line 2—2 of Figure 1.

Hitherto, the handling of materials which have to be conveyed into or out of a container under super-atmospheric pressure has presented serious problems of leakage and power expenditure. The problems become aggravated when the material to be conveyed is powdered material, since any escape of pressure causes the powdered material to be blown into the atmosphere with consequent discomfort and possible hazard. The loss of the powdered material and the cleaning problem which arises by the scattering of the material make such leakage a costly matter, especially in the case of material like powdered coal.

The present invention eliminates these disadvantages by completely preventing the leakage of pressure and loss or scattering of material. In the present invention, an endless flight conveyor is mounted throughout its entire circuit in a pressure-tight enclosure structure which includes a material supply container and a material feeder container.

The supply container consists of a bin or hopper which has a pressure-tight closure, such as a cover plate. This cover plate is removed and the bin is filled with the material to be conveyed, by the use of a conventional conveyor. The cover plate is then replaced and the necessary pressure applied to the system. The conveyor is then started in operation to convey the material from the supply container to the feeder container. The invention is especially well-adapted for the conveying of powdered coal from a supply container or bin to a feeder or delivery container where it is subjected to an air blast which blows it through a nozzle into the firebox of a steam boiler or the combustion chamber of a gas turbine.

Referring to the drawings in detail, Figure 1 shows a pressurized and substantially pressure tight structure designated 10, which includes a supply container 11 and a feeder or delivery container 12. Mounted in the structure 10 is a flight conveyor generally designated 13. The flight conveyor 13 is of the endless type and is supported at its opposite ends upon sprockets 14 and 15 mounted on shafts 16 and 17 journaled in bearings 18 and 19 respectively.

The bearings 18 (one only being shown) are mounted on the outside of a drive container or box 20 through the side walls of which the drive shaft 16 passes in an approximately air-tight connection. One end of the drive shaft 16 carries a pulley 21 which is drivingly connected by an endless belt 22 to a pulley 23 upon the output shaft 24 of a conventional reduction gear box generally designated 25, the input shaft 26 of which carries the armature of an electric motor 27 which in turn is bolted to a platform 28 mounted on a bracket structure 29 projecting from and connected to the drive container 20. The latter is provided at its upper end with a peripheral flange 30 to which is bolted a closure plate 31.

The bearings 19 (one only being shown) on the other hand, which support the shaft 17 of the idler sprocket 15 at the opposite end of the endless conveyor 13, are mounted upon a slide 32 which in turn is slidably mounted on a platform 33 having an upturned end 34 through which passes a screw shaft 35 carrying a nut 36. The screw shaft 35 at its opposite end is connected to the slide 32 in such a manner as to reciprocate the slide when the screw shaft 35 is rotated, so as to move the bearings 19 and shaft 17 toward or away from the bearings 18 and shaft 16 in order to adjust the slack in the endless conveyor 13. The platform 33 extends between and is connected to the opposite side walls of the idler container or tail box 37. The containers 20 and 37 form a part of the structure 10 and are of similar construction. The idler container 37 is similarly provided with a peripheral flange 38 at its upper end to which is bolted a cover plate 39. A cleanout pipe 40 extends downward from the bottom of the tailbox or idler container 37 and is provided with a gate valve 41 by which it may be opened or closed.

The drive container 20 and idler container 37 are connected to the supply container 11 and delivery container 12 respectively by a conduit system generally designated 42, also forming a part of the structure 10, through which the endless flight conveyor 13 passes. The conduit system 42 includes upper conduit sections 43 and 44 extending between the tailbox 37 and the supply container 11, and upper conduit sections 45 and 46 extending between the supply container 11 and the drive box 20. The conduit system 42 also includes lower conduit sections 47 and 48 extending between the drive box 20 and an inlet pressure-sealing device, generally designated 49, which at its other end is connected to the feeder compartment 12.

On its opposite side the delivery container 12 is connected to an outlet pressure-sealing device 50, similar to the pressure-sealing device 49 and similarly connected by conduit sections 51 and 52 to the tail box 37. The lower portion of the drive box 20 is provided with a trough 53 of V-shaped cross-section opening into the bell-mouthed portion 54 of the conduit section 47 and having an upwardly-turned portion 55 at its opposite end. The pipe section 43 forming the outlet from the tail box 37 is similarly provided with a bell-mouthed portion 56. The bell-mouthed portions 54 and 56 facilitate the passage of the conveyor into the upper and lower courses of the conduit system 42.

The flight conveyor 13 may be of any suitable type, such as the type described and claimed in my co-pending application Serial No. 676,546, filed June 13, 1946 for Flight Conveyor. Briefly described, the flight conveyor 13 consists on an endless chain 57 to the links 58 of which semi-circular clamping plates 59 are connected, these being clamped together on opposite sides of circular disc flights 60 by fasteners 61 (Figure 2). The clamping plates 59 have ears 62 projecting therefrom along the links 58, to which they are attached by the pivot pins 63 which interconnect the links 58. The disc flights 60 are preferably of elastic deformable material, such as rubber or synthetic rubber, where the temperature conditions permit. Where the temperatures of the spaces through which the flight conveyor 13 must pass exceed the curing temperature of rubber or synthetic rubber, however, it is more convenient to use discs of metal or other material capable of withstanding such higher temperatures.

The pressure-sealing devices 49 and 50 may be of the type described and claimed in my co-pending application Serial No. 735,401 filed March 18, 1947 for Self-Sealing Conveyor Construction, Serial No. 15,368 filed March 17, 1948 for Pressure-Sealed Conveyor System, or Serial No. 24,580 filed May 1, 1948, for Flight Conveyor Sealing Device.

For the purposes of the present invention, the construction of the sealing devices 49 and 50 may be briefly summarized as consisting of flanged tubular casings 64 which are placed in the gaps between the conduit sections 48 and 51 respectively and the feeder compartment 12, to which they are bolted or otherwise fastened. The casings 64 are lined with hollow tubular liners 65 of elastic deformable material such as rubber or synthetic rubber and containing annular inflation chambers 66 connected to pipes 67 extending through the side walls thereof. By supplying compressed air or liquid under pressure to the pipes 67 and thence to the inflation compartments 66, the inner wall of the hollow liner 65 is caused to move radially inward and thereby decrease in internal diameter, causing the inner wall to tightly hug the conveyor flights 60 as they pass through on their way to and from the delivery container 12. By adjusting the pressure in the inflation chamber 66, the liner 65 may be caused to engage the conveyor flights 60 with a force sufficient to prevent leakage of pressure around the flights 60 while at the same time permitting the latter to pass with the minimum of friction. In the event that it becomes necessary to cool the sealing devices 49, a cooling liquid, such as water, can be circulated through the inflation chamber 66, in which case an outlet pipe is provided, as explained more fully in the foregoing co-pending applications, a throttle valve in the outlet pipe enabling an inflation pressure to be built up in the inflation chamber 66.

In order to hold down the flight conveyor 13 where it passes through the lower part of the supply container 11, the latter is provided with a hold-down member 68 of inverted V-shaped cross-section, such as an angle bar extending between the opposite sides of the supply container 11. The conveyor flights 60 engage the inverted V-groove formed by this angle member 68 and are thereby held down against the material in the lower part of the container 11. The container 11 is in the form of a bin or hopper having at its upper end a peripheral flange 69 closed by a cover plate 70 which is bolted or otherwise secured thereto. In order to place the supply container 11, drive box 20 and tail box 37 under pressure and equalize the pressure therein, compressed air is supplied through an inlet pipe 71 through a valve 72 to branch pipes 73, 74 and 75 leading respectively to the interiors of the supply container 11, the drive box 20 and the tail box 37.

The feeder or delivery container 12 consists of a box-like housing 76 having a flanged upper end 77 to which is bolted a closure plate 78. The housing 76 is provided with sloping lower side walls 79 leading downward to a transverse delivery conduit 80, the upper portion of which is cut away as at 81 to permit the powdered material to drop into the conduit 80. The conduit 80 at one end may be connected to a source of compressed air (not shown) and at its other end to a nozzle (also not shown) by means of which the powdered coal is discharged into a boiler firebox or gas turbine combustion chamber.

The upper side walls 82 of the housing 76 are apertured for the passage of the flight conveyor 13 and a flanged pipe section 83 is bolted between the side walls 82 in order to support the flight conveyor 13 where it passes through the delivery container 12. The lower portion of the pipe section 83 is provided with an elongated longitudinally tapered discharge opening 84 of approximately triangular or trapezoidal outline, which widens in the direction of travel of the conveyor and which cooperates with a similarly shaped discharge opening 85 alignable therewith and formed in a sleeve 86 rotatably mounted on the pipe section 83. A set screw 87 threaded through the side wall of the sleeve 86 serves to lock the sleeve 86 in any position of adjustment so as to vary the discharge opening resulting from the alignment or mis-alignment of the openings 84 and 85.

In the operation of the invention, the cover plate 70 is temporarily removed while an ordinary conveyor is employed to discharge the material into the supply container 11. The cover plate 70 is then replaced upon the flanged portion 69 and bolted tightly down, a gasket (not shown) being optionally employed to insure tightness. While bolts have been shown for securing the cover plate 70, quick-acting clamps, such as are used for hatches or water-tight doors in ships at sea, may obviously be employed, or any other conventional clamping devices. The valve 72 is then opened and compressed air admitted from the pipe 71 to the branch pipes 73, 74 and 75, filling the empty spaces in the supply container 11 and boxes 20 and 37 with air under pressure. Air or liquid under pressure is also supplied to the pipes 67, inflating the chambers 66 of the sealing devices 49 and 50. The motor 27 is then started, causing the drive shaft 16 and sprocket 14 to rotate, so that the flight conveyor 13 is set in motion.

As the flights 60 of the flight conveyor 13 pass through the lower portion of the supply container 11 beneath the hold-down member 68, they pick up the material therein and convey it through the pipe sections 45 and 46 into the drive box or drive container 20, where it drops vertically into the V-shaped trough 53. The chain 58 and flights 60, thus relieved of the material, continue around the sprocket 14 and again pick up the material when they reach the trough 53, carrying it through the pipe sections 47 and 48 and the inlet pressure sealing device 49 into the pipe section 83. As the material passes over the openings 84, 85, it drops through these openings into the lower part of the housing 76 of the feeder or delivery container 12. The material is guided downward by the sloping bottom walls 79 through the opening 81 into the conduit 80. The longitudinally-tapered openings 84 and 85 prevent the conveyed material from dropping in intermittent batches and even out the flow thereof into a uniform continuous and uninterrupted flow. The set screw 87 enables the opening to be adjusted to give a uniform flow for the particular conveyor speed employed.

Meanwhile, air under a higher pressure than that supplied through the pipes 71 to the supply container 11 and boxes 20 and 37 is supplied to the delivery conduit 80. This pressure fluid picks up the material and expels it through the conduit 80 and the nozzle thereon into the boiler fire box, gas turbine combustion chamber or other place of utilization. Thus, a supply of the material is conveyed constantly from the supply container 11 and is deposited continuously in the feeder or delivery container 12 and expelled therefrom through the delivery conduit 80 into the place of utilization. The flight conveyor 13, thus freed from its load of material, passes outward through the outlet pressure-sealing device 50 and the pipe sections 51 and 52 into the lower part of the tail box 37.

The flight conveyor 13 passes around the idler sprocket 15 and out of the tailbox 37 through the pipe sections 43 and 44 back into the supply container 11. Here it picks up another load of the material and repeats the foregoing cycle continuously as long as the motor 27 remains in operation and a supply of the material remains in the supply container 11.

Since the entire conduit system 42, together with the supply container 11, boxes 20 and 37, and feeder or delivery container 12 are under pressure, the conveyor 13 is enabled to move freely and easily around its circuit, and only a low expenditure of power is required. Since there is only a slightly higher air pressure in the conduit 80 and delivery container 12 than in the remainder of the system, the conveyor encounters only a slightly increased load as it passes through the container 12, added to the friction existing in the system or created by the liners 65 of the sealing devices 49 and 50. When the supply of material in the supply container 11 is exhausted, it is replenished by removing the cover plate 70 and refilling as described above.

What I claim is:

1. A pressurized conveyor apparatus for powdered material, comprising a substantially pressure-tight structure including a pressure-tight supply container and a pressure-tight delivery container separated from one another and arranged in spaced relationship, and a conduit system interconnecting said containers; an endless flight conveyor mounted in said structure and traversing said conduit system, a pressure fluid connection communicating with said structure for placing said structure under pressure, a material delivery conduit connected to said delivery container, and an additional pressure-fluid connection communicating with said delivery container for expelling the powdered material from said delivery container through said delivery conduit.

2. A pressurized conveyor apparatus for powdered material, comprising a substantially pressure-tight structure including a pressure-tight supply container and a pressure-tight delivery container separated from one another and arranged in spaced relationship, and a conduit system interconnecting said containers; an endless flight conveyor mounted in said structure and traversing said conduit system, a pressure fluid connection communicating with said structure for placing said structure under pressure, a tubular flight conveyor sealing device mounted on at least one side of said delivery container in the path of said flight conveyor and having a constricted portion snugly engageable with the peripheries of the conveyor flights for preventing escape of pressure fluid from said system, a material delivery conduit connected to said delivery container, and an additional pressure-fluid connection communicating with said delivery container for expelling the powdered material from said delivery container through said delivery conduit.

3. A pressurized conveyor apparatus for powdered material, comprising a substantially pressure-tight structure including a pressure-tight supply container and a pressure-tight delivery container separated from one another and arranged in spaced relationship, and a conduit system interconnecting said containers; an endless flight conveyor mounted in said structure and traversing said conduit system, a pressure fluid connection communicating with said structure for placing said structure under pressure, a tubular flight conveyor sealing device mounted on opposite sides of said delivery container in the path of said flight conveyor and having a constricted portion snugly engageable with the peripheries of the conveyor flights for preventing escape of pressure fluid from said system, a material delivery conduit connected to said delivery container, and an additional pressure-fluid connection communicating with said delivery container for expelling the powdered material from said delivery container through said delivery conduit.

4. A pressurized conveyor apparatus for powdered material, comprising a substantially pressure-tight structure including a supply container and a delivery container arranged in spaced relationship, and a conduit system interconnecting said containers; an endless flight conveyor mounted in and traversing said structure, and a pressure fluid connection communicating with said structure for placing said structure under pressure, said delivery container having a conveyor conduit section therein with a longitudinally-tapered discharge opening of increasing width in the direction of conveyor travel whereby to prevent pulsating discharge of material from said conveyor and insure substantially even and continuous flow thereof.

5. A pressurized conveyor apparatus for powdered material, comprising a substantially pressure-tight structure including a supply container and a delivery container arranged in spaced relationship, and a conduit system interconnecting said containers; an endless flight conveyor mounted in and traversing said structure, and a pressure fluid connection communicating with said structure for placing said structure under pressure, said delivery container having a conveyor conduit portion therein and a closure member mounted adjacent a wall portion of said conduit portion, said wall portion and said closure member having longitudinally-tapered communicating discharge openings therein of increasing widths in the direction of conveyor travel whereby to convert pulsating discharge of material from said conveyor into substantially even and continuous flow thereof.

6. A pressurized conveyor apparatus for powdered material, comprising a substantially pressure-tight structure including a pressure-tight supply container and a pressure-tight delivery container separated from one another and arranged in spaced relationship, and a conduit system interconnecting said containers; an endless flight conveyor mounted in said structure and traversing said conduit system, a pressure fluid connection communicating with said structure for placing said structure under pressure, a delivery conduit connected to the lower portion of said delivery container, and an additional pressure-fluid connection communicating with said delivery conduit for expelling the material therefrom said delivery conduit connection being connected to a source of pressure fluid at a higher pressure than said conduit structure connection.

7. A pressurized conveyor apparatus for powdered material, comprising a substantially pressure-tight structure including a closed supply container separated from and, a closed delivery container spaced apart from said supply container, a drive container and an idler container, a closed conduit system interconnecting said containers, an endless flight conveyor mounted in said structure and traversing said conduit system, a rotary driving member mounted in said drive container and drivingly engaging said conveyor, a pressure fluid connection communicating with said structure for placing said structure under pressure, and a constricted conveyor sealing device interposed in said conveyor system on at least one side of said delivery container and sealingly engaging the flights of said conveyor, a material delivery conduit connected to said delivery container, and an additional pressure-fluid connection communicating with said delivery container for expelling the powdered material from said delivery container through said delivery conduit.

8. A pressurized conveyor apparatus for powdered material, comprising a substantially pressure-tight structure including a closed supply container separated from and, a closed delivery container spaced apart from said supply container, a drive container and an idler container, a closed conduit system interconnecting said containers, an endless flight conveyor mounted in said structure and traversing said conduit system, a rotary driving member mounted in said drive container and drivingly engaging said conveyor, a pressure fluid connection communicating with said structure for placing said structure under pressure, and a constricted conveyor sealing device interposed in said conveyor system on opposite sides of said delivery container and sealingly engaging the flights of said conveyor, a material delivery conduit connected to said delivery container, and an additional pressure-fluid connection communicating with said delivery container for expelling the powdered material from said delivery container through said delivery conduit.

9. A pressurized conveyor apparatus for powdered material, comprising a substantially pressure-tight structure including a closed supply container, a closed delivery container spaced apart from said supply container, a drive container and an idler container, a closed conduit system interconnecting said containers, an endless flight conveyor mounted in and traversing said structure, a rotary driving member mounted in said drive container and drivingly engaging said conveyor, a pressure fluid connection communicating with said structure for placing said structure under pressure, a conveyor sealing device interposed in said conveyor system on opposite sides of said delivery container and sealingly engaging the flights of said conveyor, and an additional pressure fluid connection to said delivery container for subjecting said delivery container to a higher pressure than said conduit system.

10. A pressurized conveyor apparatus for powdered material, comprising a substantially pressure-tight structure including a closed supply container separated from and, a closed delivery container spaced apart from said supply container, a drive container and an idler container, a closed conduit system interconnecting said containers, an endless flight conveyor mounted in said structure and traversing said conduit system, a rotary driving member mounted in said drive container and drivingly engaging said conveyor, a pressure fluid connection communicating with said structure for placing said structure under pressure, a constricted conveyor sealing device interposed in said conveyor system on opposite sides of said delivery container and sealingly engaging the flights of said conveyor, a delivery conduit connected to said delivery container, and a pressure fluid connection communicating with said delivery conduit for expelling the material therefrom.

HENRY W. HAPMAN.

REFERENCES CITED

The following references are of record in the file of this patent:

UNITED STATES PATENTS

| Number | Name | Date |
| --- | --- | --- |
| 674,685 | Payson | May 21, 1901 |
| 1,843,522 | Sprague | Feb. 2, 1932 |
| 2,335,611 | Pray | Nov. 30, 1943 |

FOREIGN PATENTS

| Number | Country | Date |
| --- | --- | --- |
| 260,221 | Great Britain | Dec. 21, 1927 |
| 579,908 | Germany | July 3, 1933 |